US012792259B2

United States Patent
(12) United States Patent
Jeong et al.

(10) Patent No.: US 12,792,259 B2
(45) Date of Patent: Nov. 10, 2026

(54) MEMORY SYSTEM AND OPERATING METHOD THEREOF

(71) Applicant: SK hynix Inc., Gyeonggi-do (KR)

(72) Inventors: Yoon Seok Jeong, Gyeonggi-do (KR); Chae Young Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 19/023,386

(22) Filed: Jan. 16, 2025

(65) Prior Publication Data

US 2025/0362830 A1 Nov. 27, 2025

(30) Foreign Application Priority Data

May 24, 2024 (KR) ........................ 10-2024-0067833

(51) Int. Cl.
*G06F 3/06* (2006.01)
*G06F 1/24* (2006.01)
*G06F 11/07* (2006.01)
*G06F 11/34* (2006.01)

(52) U.S. Cl.
CPC .............. *G06F 3/0655* (2013.01); *G06F 1/24* (2013.01); *G06F 3/0604* (2013.01); *G06F 3/0632* (2013.01); *G06F 3/0679* (2013.01); *G06F 11/0727* (2013.01); *G06F 11/34* (2013.01)

(58) Field of Classification Search
None
See application file for complete search history.

(56) References Cited

U.S. PATENT DOCUMENTS

| | | | | |
|---|---|---|---|---|
| 2019/0243637 | A1* | 8/2019 | Nachimuthu | G06F 3/0632 |
| 2021/0382780 | A1* | 12/2021 | Muthiah | G06F 11/0757 |
| 2022/0075682 | A1 | 3/2022 | Zhu et al. | |
| 2023/0153038 | A1* | 5/2023 | Yoo | G06F 3/0629 711/114 |
| 2024/0103720 | A1* | 3/2024 | Am | G06F 8/656 |
| 2025/0060908 | A1* | 2/2025 | Siluvainathan | G06F 3/0659 |

FOREIGN PATENT DOCUMENTS

| | | | | |
|---|---|---|---|---|
| KR | 20210008923 | A * | 1/2021 | G11C 29/52 |
| KR | 10-2021-0155340 | A | 12/2021 | |

OTHER PUBLICATIONS

Siluvainathan et al. “Maintaining Connection with CXL Host on Reset.” Filed Aug. 18, 2023. U.S. Appl. No. 63/533,490.*
Translation of KR-20210008923-A. 2026.*

* cited by examiner

*Primary Examiner* — Nathan Sadler
(74) *Attorney, Agent, or Firm* — IP&T GROUP LLP

(57) ABSTRACT

A memory system may include a memory device and a memory controller. The memory controller may execute firmware which controls the memory device, perform, when an abnormal event of the firmware is sensed, data communication with a host, based on hardware in place of the firmware, and reset the memory device when the access traffic is a threshold value or less.

18 Claims, 7 Drawing Sheets

MEMORY SYSTEM AND OPERATING METHOD THEREOF

CROSS-REFERENCE TO RELATED APPLICATION

The present application claims priority under 35 U.S.C. § 119(a) to Korean patent application number 10-2024-0067833 filed on May 24, 2024, the entire disclosure of which is incorporated by reference herein.

BACKGROUND

1. Field of Invention

Embodiments of the present disclosure generally relate to an electronic device, and more particularly, to a memory system and an operating method thereof.

2. Description of Related Art

A memory system may store data under the control of a host device such as a computer or a smartphone. The memory system may include a memory device in which data is stored and a memory controller which controls the memory device. Memory devices are classified into volatile memory devices and nonvolatile memory devices.

A volatile memory device is capable of storing data only when power is supplied, which means that data stored therein disappears when the supply of power is interrupted. The volatile memory device may be a Static Random Access Memory (SRAM), a Dynamic Random Access Memory (DRAM), or the like.

A nonvolatile memory device is capable of storing data even when the supply of power is interrupted. The nonvolatile memory device may be a Read Only Memory (ROM), a Programmable ROM (PROM), an Electrically Programmable ROM (EPROM), an Electrically Erasable ROM (EEROM), a flash memory, or the like.

In the memory system, the memory controller may control a program operation and a read operation of the memory device through firmware. When the memory controller senses an abnormal event of the firmware, the memory controller may control an operation of the memory device, using hardware in place of the firmware, before the memory device is reset.

SUMMARY

Embodiments of the present disclosure provide a memory system capable of communicating with a host, based on hardware in place of firmware, and resetting a memory device in a firmware malfunction, and an operating method of the memory system.

In accordance with an embodiment of the present disclosure, there is provided a memory system including a memory device; and a memory controller configured to execute firmware which controls the memory device, perform, when an abnormal event of the firmware is sensed, data communication with a host, based on hardware in place of the firmware, and reset the memory device when access traffic of the host to the memory device is a threshold value or less.

In accordance with another embodiment of the present disclosure, there is provided a method of operating a memory system including a memory device, the method including sensing an abnormal event of firmware which controls the memory device; performing, in response to the abnormal event of the firmware, data communication with a host, based on hardware in place of the firmware; and resetting the memory device when access traffic of the host to the memory device is a threshold value or less.

BRIEF DESCRIPTION OF THE DRAWINGS

Various embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
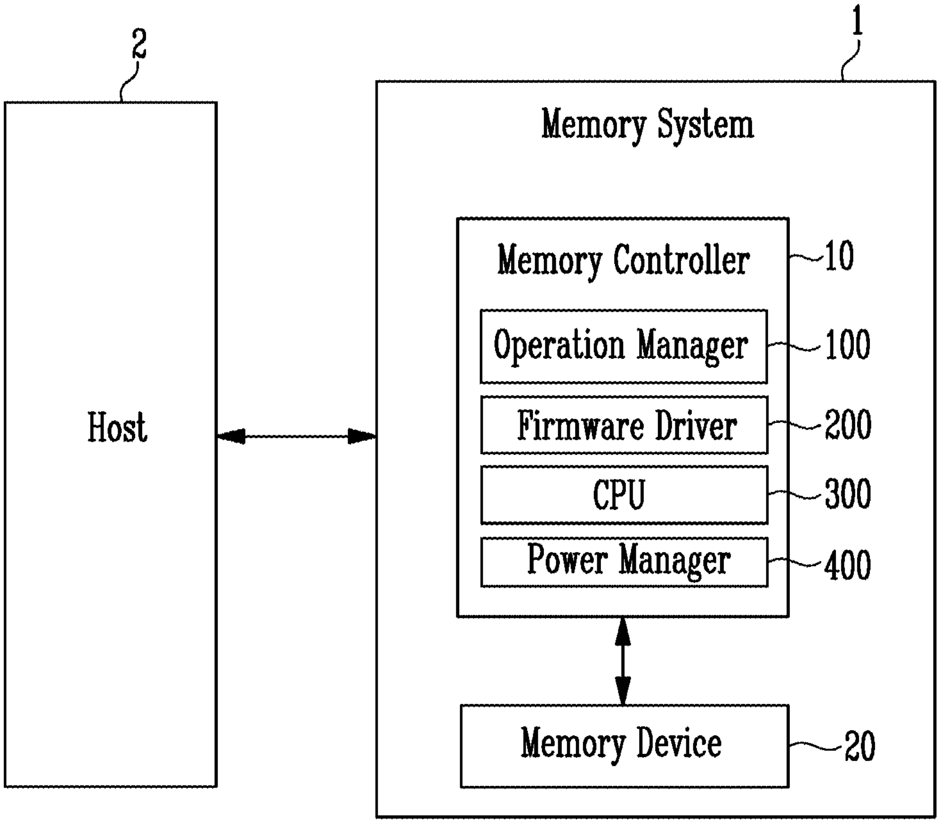
FIG. 1 is a diagram illustrating a memory system in accordance with an embodiment of the present disclosure.

FIG. 1 is a diagram illustrating a memory system 1 in accordance with an embodiment of the present disclosure.

Referring to FIG. 1, the memory system 1 may include a memory device 20 and a memory controller 10 which controls an operation of the memory device 20. The memory system 1 may be a device which stores data under the control of a host 2, such as a mobile phone, a smartphone, an MP3 player, a laptop computer, a server computer, a desktop computer, a game console, a TV, a tablet PC or an in-vehicle infotainment system. The host 2 may be an external device of the memory system 1.

The memory system 1 may be manufactured as any of various types of memory modules according to a host interface as a communication scheme with the host 2. For example, the memory system 1 may be configured as any of a various types of memory modules, such as a Solid State Drive (SSD), a multimedia card in the form of an MMC, an eMMC, an RS-MMC and a micro-MMC, a secure digital card in the form of an SD, a mini-SD and a micro-SD, a Universal Serial Bus (USB) memory module, a Universal Flash Storage (UFS) device, a personal computer memory card international association (PCMCIA) card type memory module, a peripheral component interconnection (PCI) card type memory module, a PCI express (PCI-E) card type memory module, a Compact Flash (CF) card, a Smart Media Card (SMC), and a memory stick.

The memory system 1 may be manufactured as any of various package types. For example, the memory system 1 may be manufactured as any of various package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 20 may store data. The memory device 20 may operate under the control of the memory controller 10. The memory device 20 may include a memory cell array including a plurality of memory cells which store data.

The memory cell array may include a plurality of memory blocks. Each memory block may include a plurality of memory cells. One memory block may include a plurality of pages. In an embodiment, the page may be a unit for storing data in the memory device 20 or reading data stored in the memory device 20.

In an embodiment, the memory device 20 may include a volatile memory. The volatile memory may include a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), and a Rambus Dynamic Random Access Memory (RDRAM). In another embodiment, the memory device 20 may include a nonvolatile memory. The nonvolatile memory may include a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), and the like.

The memory device 20 may receive a command and an address from the memory controller 10, and access an area selected by the address in the memory cell array. The memory device 20 may perform an operation indicated by the command on the area selected by the address. For example, the memory device 20 may perform a write operation and a read operation. In the write operation, the memory device 20 may program data in the area selected by the address. In the read operation, the memory device 20 may read data from the area selected by the address.

The memory controller 10 may control overall operations of the memory system 1.

In an embodiment, the memory controller 10 may receive data and a logical address from the host 2. The memory controller 10 may translate the logical address into a physical address indicating positions of memory cells of the memory device 20, in which data is to be stored. The memory controller 10 may control the memory device 20 to perform a program operation, a read operation, an erase operation, or the like according to a request of the host 2.

The host 2 may communicate with the memory system 1, using at least one of various communication standards or interfaces, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

In an embodiment, the memory system 1 may be a Compute express Link (CXL) device, the memory controller 10 may be a CXL controller, and the memory device 20 may be a DRAM.

In the case of the DRAM, firmware plays only a role of performing a partial setting in a booting process of the memory system 1 in relation to access traffic to the memory device 20, and is not directly involved in the access traffic during runtime. Therefore, although execution of the firmware is suspended as the firmware cannot perform a normal operation during the runtime, the memory device 20 may not be immediately reset in terms of the access traffic.

Accordingly, the embodiment of the present disclosure has a technical meaning that, even when the firmware cannot perform a normal operation, the memory device 20 is not immediately reset, for a time at which influence affecting the memory system 1 can be minimized, and then the memory device 20 is reset at an appropriate time.

Since the memory device 20 is used as the DRAM, a state or operation of the memory device 20 may have a large influence on the entire memory system 1. When the memory device 20 is suddenly terminated due to an abnormal operation, a situation in which the entire memory system 1 is terminated may occur, and system performance may be largely influenced in a process of dumping data stored by the memory device 20 to another memory device (not shown) even when the memory device 20 is reset through a normal procedure.

Accordingly, a reset time of the memory device 20 may have influence on performance of the memory system 1, and therefore, it may be unreasonable that the memory device 20 is immediately reset in a state in which the access traffic to the memory device 20 is exchanged even when the memory device 20 does not perform a normal operation.

Consequently, the memory system 1 needs to check whether the memory device 20 is to be reset and then performs resetting at an appropriate time. Further, performance deterioration of the memory system 1 can be minimized through hardware which performs data communication with the host 2 in place of the firmware and processes access traffic to the memory device 20 when the firmware cannot normally operate.

In an embodiment, the memory controller 10 may execute the firmware which controls the memory device 20. When the memory controller 10 senses an abnormal event of the firmware, the memory controller 10 may perform data communication with the host 2, using hardware in place of the firmware. The memory controller 10 may monitor access traffic of the host 2 to the memory device 20. The memory controller 10 may reset the memory device 20 when the monitored access traffic is a threshold value or less.

The memory controller 10 may include an operation manager 100 and a firmware driver 200.

The operation manager 100 may perform data communication with the host 2, as hardware in place of the firmware driver 200 which drives the firmware, in response to a firmware abnormal signal. In place of the firmware, while the firmware is abnormal, the operation manager 100 may perform, in a hardware manner, a role of receiving a request from the host 2 and providing the host 2 with a response to the received request. The operation manager 100 may monitor access traffic of the host 2 to the memory device 20, and reset the memory device 20 when the monitored access traffic is a threshold value or less.

A Central Processing Unit (CPU) 300 may determine that a crash has occurred when proper driving of a computer program (e.g., application software, or operating system) is stopped, and issue a memory dump request. The CPU 300 may activate an interrupt signal indicating system abnormality to be output to the firmware driver 200 together with the issuing of the memory dump request.

A power manager 400 may enter into a sleep mode and activate a sleep mode signal to be output to the firmware driver 200 when a power-down event occurs due to a request of the host 2 or a policy of the memory system 1.

Figure 2:
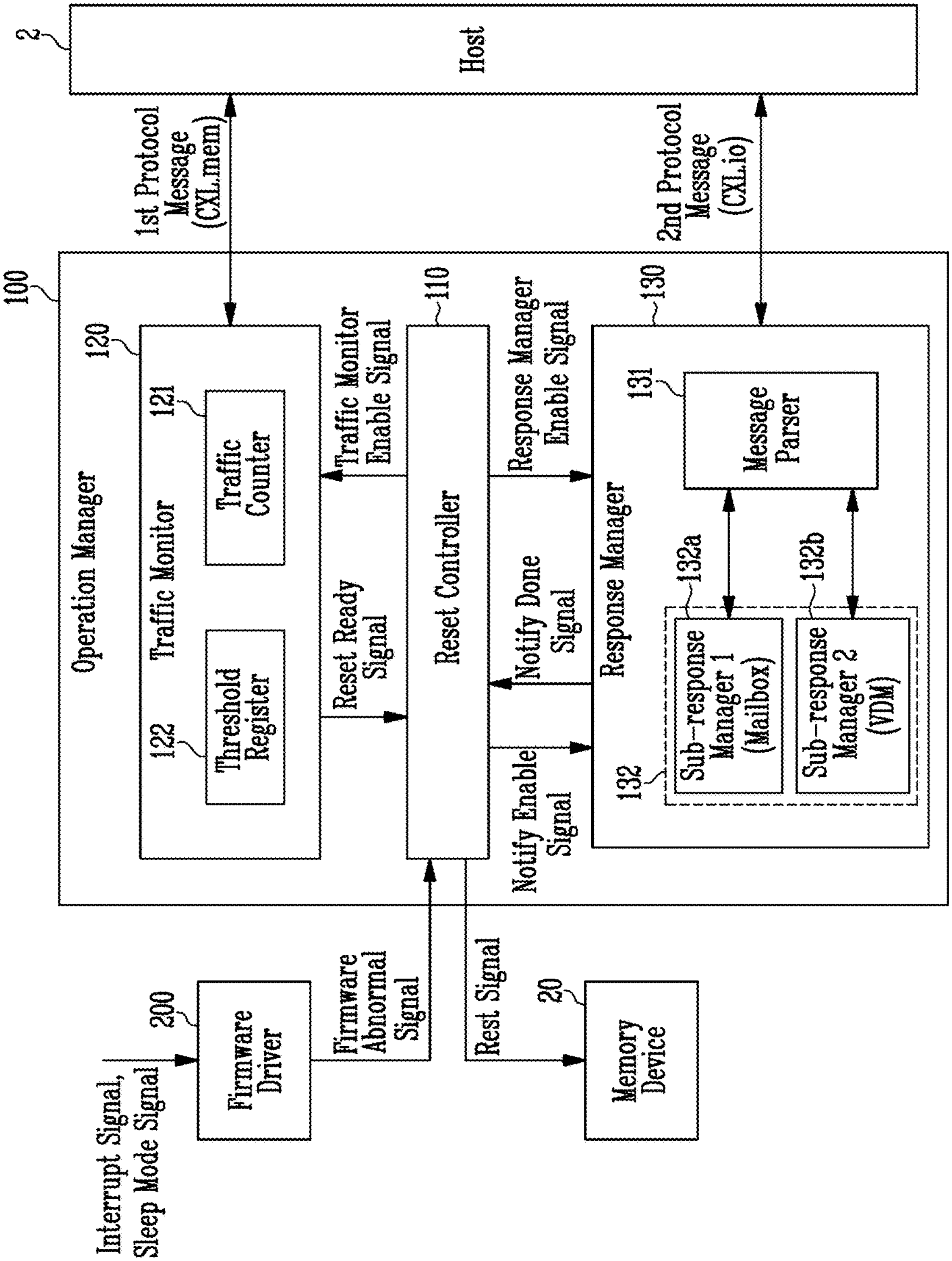
FIG. 2 is a diagram illustrating a configuration and an operation of an operation manager shown in FIG. 1, in accordance with an embodiment of the present disclosure.

FIG. 2 is a diagram illustrating a configuration and an operation of the operation manager shown in FIG. 1, in accordance with an embodiment of the present disclosure.

Referring to FIG. 2, the operation manager 100 may perform data communication with the host in place of firmware while the firmware is abnormal, and reset the memory device 20 when traffic of the data communication is a threshold value or less.

The operation manager 100 may include a reset controller 110, a traffic monitor 120, and a response manager 130.

The reset controller 110 may enable the traffic monitor 120 and the response manager 130 when the reset controller 110 receives a firmware abnormal signal from the firmware driver 200. The reset controller 110 may activate a traffic monitor enable signal to be output to the traffic monitor 120, and activate a response manager enable signal to be output to the response manager 130.

The traffic monitor 120 may monitor the traffic of the data communication with the host 2 in response to the traffic monitor enable signal. The traffic monitor 120 may activate a reset ready signal to be output to the reset controller 110 when the traffic of the data communication is the threshold value or less.

In FIG. 2, the traffic monitor 120 may include a traffic counter 121 and a threshold register 122.

The traffic counter 121 may perform a snoop transaction on a first protocol message exchanged in the data communication with the host 2. A first protocol may include a CXL.mem protocol. The traffic counter 121 may measure traffic of the data communication through the snoop transaction. The threshold register 122 may store a traffic threshold value of the data communication.

The response manager 130 may perform the data communication with the host 2 in response to the response manager enable signal. The response manager 130 may provide the host 2 with a response to a second protocol message included in a request of the host 2. A second protocol may include a CXL.io protocol. For example, the response to the second protocol message may indicate whether the request of the host 2 has failed, whether the request of the host 2 is valid, and the like.

In FIG. 2, the response manager 130 may include a message parser 131 and at least one sub-response manager 132.

The message parser 131 may analyze the second protocol message (e.g., a Transaction Layer Packet (TLP)), and transfer the analyzed message to the at least one sub-response manager 132. The message parser 131 may provide the host 2 with a response to the second protocol message, which is received from the at least one sub-response manager 132. In an embodiment, the message parser 131 may transfer the analyzed message to a target sub-response manager corresponding to the analyzed message, among the at least one sub-response manager 132. The message parser 131 may provide the host 2 with the response transferred from the target sub-response manager through multiplexing.

The at least one sub-response manager 132 may include a first sub-response manager **132*a* and a second sub-response manager 132*b***. The number of sub-response managers is not limited to this embodiment.

An interface of the first sub-response manager **132*a* may be of a mailbox type, and an interface of the second sub-response manager 132*b* may be of a Vendor Defined Message (VDM) type. The interface of the sub-response manager 132** is not limited to this embodiment, and any interface may be applied as long as the interface is an interface (e.g., a CXL interface) supported by a device.

The reset controller 110 may activate, in response to the reset ready signal received from the traffic monitor 120, a notification enable signal for requesting that a reset schedule notification for the memory device 20 is to be provided to the host 2. The notification enable signal may be output to the response manager 130.

The response manager 130 may notify a reset schedule of the memory device 20 to the host 2 in response to the notification enable signal. When the response manager 130 may receive a response to the reset schedule notification from the host 2, the response manager 130 may activate a notification done signal indicating that the reset schedule notification has been done, the notification done signal being output to the reset controller 110. Alternatively, although the response manager 130 does not receive the response to the reset schedule notification from the host 2, the response manager 130 may activate the notification done signal when a predetermined time elapses after the reset schedule notification to the host 2.

The reset controller 110 may activate a reset signal to be output to the memory device 20 in response to the notification done signal received from the response manager 130.

The firmware driver 200 may sense an abnormal event of the firmware when the firmware driver 200 receives an interrupt signal indicating system abnormality from the CPU 300 described with reference to FIG. 1. The interrupt signal may be activated by the CPU 300 when a dump request is generated due to the crash occurring when the proper driving of computer program (e.g., application software or operating system) is stopped.

When the firmware driver 200 receives a sleep mode signal from the power manager 400 described with reference to FIG. 1, the firmware driver 200 may sense an abnormal event of the firmware. The sleep mode signal may be activated by the power manager 400 when the power manager 400 enters into a sleep mode due to a request of the host 2 or a policy of the memory system 1.

When the firmware driver 200 senses the abnormal event of the firmware, the firmware driver 200 may activate a firmware abnormal signal to be output to the reset controller 110.

Figure 3:
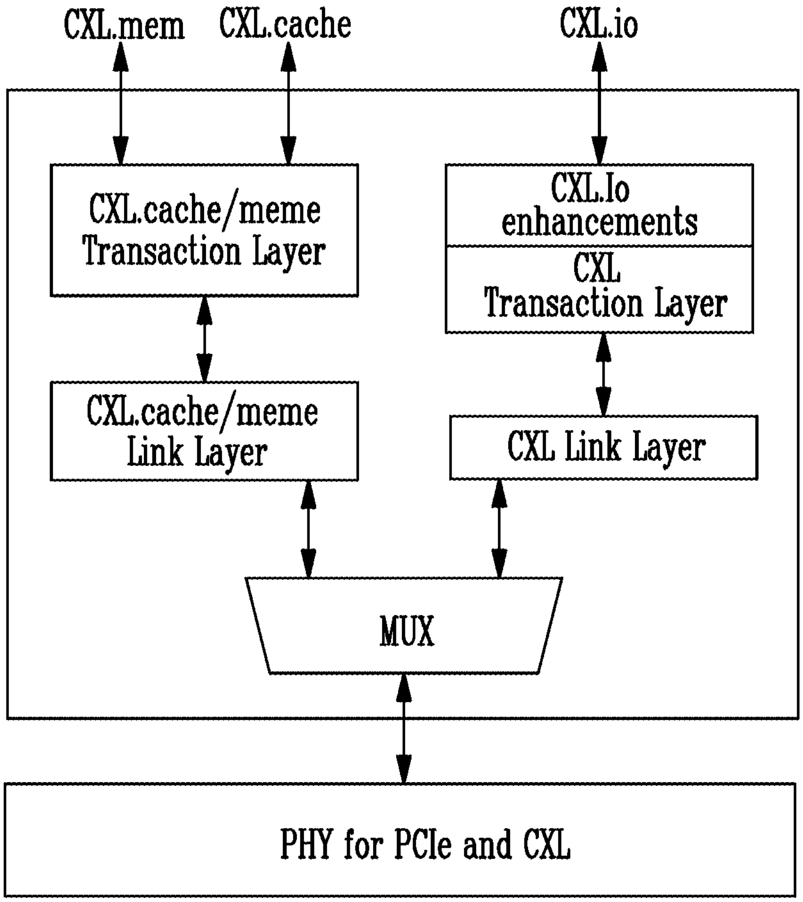
FIG. 3 is a diagram illustrating an interface protocol shown in FIG. 2, in accordance with an embodiment of the present disclosure.

FIG. 3 is a diagram illustrating an interface protocol shown in FIG. 2, in accordance with an embodiment of the present disclosure.

Referring to FIG. 3, a Computer express Link (CXL) protocol structure may include CXL.io, CXL.cache, and CXL.mem protocols. The CXL.io protocol may provide a function similar to a function of Peripheral Component Interconnect express (PCIe), such as device enumeration or Direct Memory Access (DMA). The CXL.io protocol may secure a low access delay time as compared with the PCIe in CXL device access, and be commonly used in all CXL device types.

The CXL.cache protocol may be used to maintain consistency between a cache memory of a host and a cache memory of a CXL device. The CXL.cache protocol is an asynchronous protocol, and may maintain consistency through a snoop transaction when cache consistency is damaged in a state that the host takes responsibility for the cache consistency. A consistency maintenance protocol may use Modified, Exclusive, Shared, and Invalid (MESI).

The CXL.mem may provide a function of enabling the host to access a memory of a peripheral device through a memory access (load/store) method in a cache line unit (i.e., 64 bytes). Accordingly, the host can use the memory of the peripheral device as if its own local memory.

The CXL interconnect structure may be the same as shown in FIG. 3. A physical layer of CLX may have a form in which a CXL logical PHY is added to a PHY of the PCIe. A MUX for distinguishing a transaction of the CXL.io protocol from a transaction of the CXL.mem and CXL.cache protocol may be located at an upper end of the physical layer, and a link layer and a transaction layer, which correspond to each sub-protocol, may be located at an upper end of the MUX.

Figure 4:
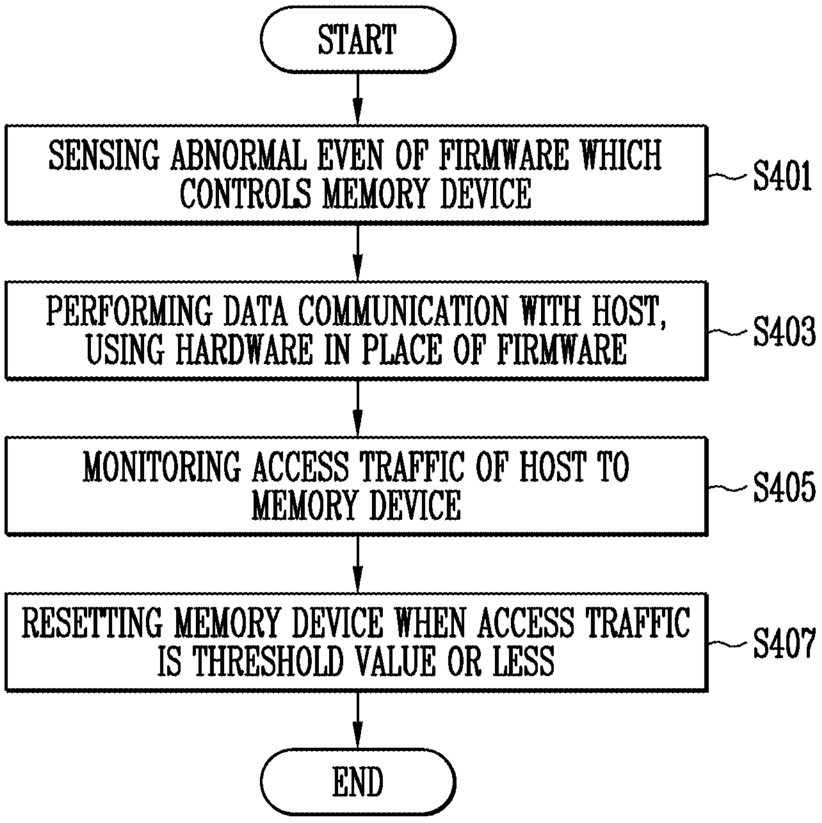
FIG. 4 is a flowchart illustrating an operation of the memory system in accordance with an embodiment of the present disclosure.

FIG. 4 is a flowchart illustrating an operation of the memory system in accordance with an embodiment of the present disclosure.

Referring to FIG. 4, in operation S401, the memory system may sense an abnormal event of firmware which controls the memory device.

In operation S403, data communication with the host may be performed using hardware in place of the firmware in the memory system.

In operation S405, the memory system may monitor access traffic of the host to the memory device.

In operation S407, the memory system may reset the memory device when the access traffic is a threshold value or less.

Figure 5A:
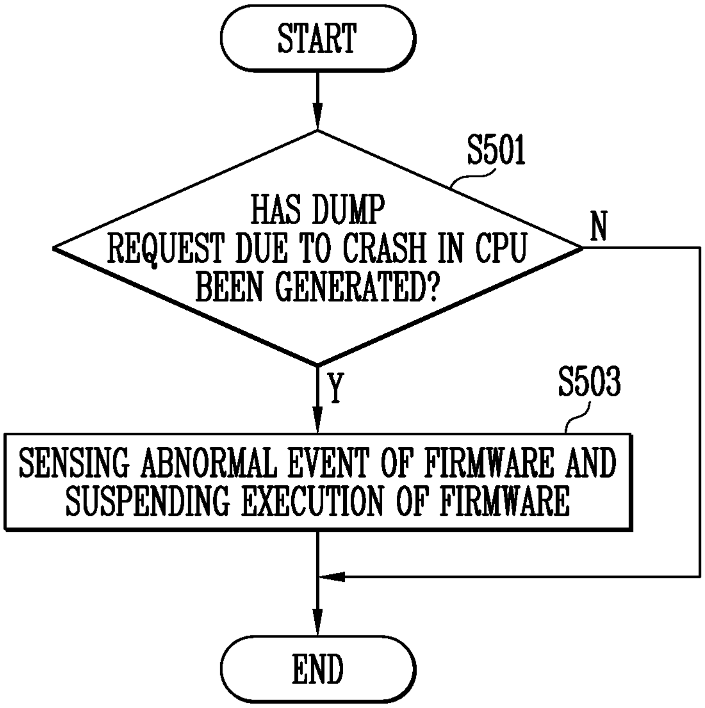
FIG. 5A is a flowchart illustrating an operation of the memory system in accordance with an embodiment of the present disclosure.

FIG. 5A is a flowchart illustrating an operation of the memory system in accordance with an embodiment of the present disclosure.

Referring to FIG. 5A, a process of sensing an abnormal event of firmware (e.g., the operation S401 of FIG. 4) is illustrated.

In operation S501, the memory system may determine whether a dump request due to a crash in the CPU has been generated. As a determination result, when the dump request is generated ("Y" in the operation S501), the memory system may proceed to operation S503. When the dump request is not generated ("N" in the operation S501), the memory system may terminate the operation.

In the operation S503, the memory system may sense an abnormal event of the firmware and suspend execution of the firmware.

Figure 5B:
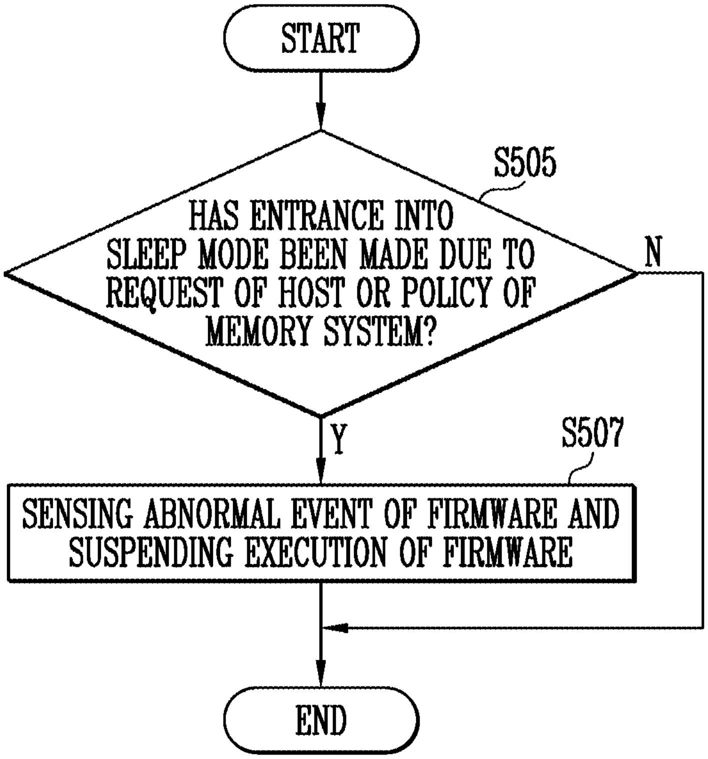
FIG. 5B is a flowchart illustrating an operation of the memory system in accordance with an embodiment of the present disclosure.

FIG. 5B is a flowchart illustrating an operation of the memory system in accordance with an embodiment of the present disclosure.

Referring to FIG. 5B, a process of sensing an abnormal event of firmware (e.g., the operation S401 of FIG. 4) is illustrated.

In operation S505, the memory system may determine whether entrance into a sleep mode has been made due to a request of the host or a policy of the memory system. As a determination result, when the entrance into the sleep mode is made ("Y" in the operation S505), the memory system may proceed to operation S507. When the entrance into the sleep mode is not made ("N" in the operation S505), the memory system may terminate the operation.

In the operation S507, the memory system may sense an abnormal event of the firmware and suspend execution of the firmware.

Figure 6:
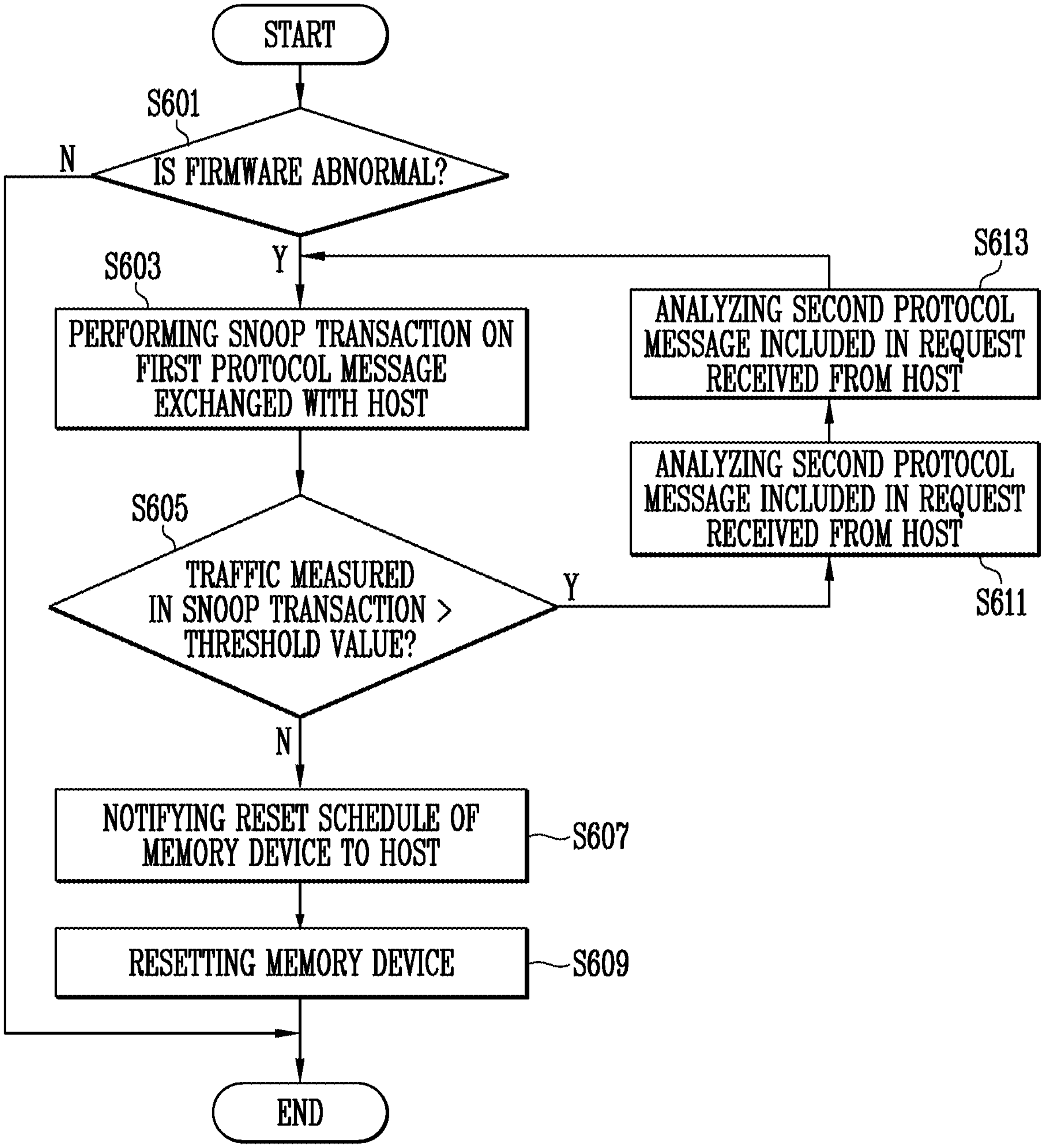
FIG. 6 is a flowchart illustrating an operation of the memory system in accordance with an embodiment of the present disclosure.

FIG. 6 is a flowchart illustrating an operation of the memory system in accordance with an embodiment of the present disclosure.

Referring to FIG. 6, in operation S601, the memory system may determine whether firmware which controls the memory device is abnormal. As a determination result, when the firmware is abnormal ("Y" in the operation S601), the memory system may proceed to operation S603. When the firmware is normal ("N" in the operation S601), the memory system may terminate the operation.

In the operation S603, the memory system may perform a snoop transaction on a first protocol message exchanged with the host. A first protocol may include a CXL.mem protocol. The first protocol message may be related to an access request of the host for the memory device. The access request may include a read request and a write request.

In operation S605, the memory system may determine whether traffic measured in the snoop transaction exceeds a threshold value. As a determination result, when the traffic exceeds the threshold value ("Y" in the operation S605), the memory device may proceed to operation S611. When the traffic is the threshold value or less ("N" in the operation S605), the memory system may proceed to operation S607.

In the operation S607, the memory system may notify a reset schedule of the memory device to the host.

In operation S609, the memory system may reset the memory device. For example, the memory system may reset the memory device when a predetermined time elapses after the memory system receives a response to the notification of the reset schedule from the host or after the reset schedule is notified.

In the operation S611, the memory system may analyze a second protocol message included in a request received from the host. A second protocol may include a CXL.io protocol.

In operation S613, the memory system may provide the host with a response generated based on the analyzed message.

In the operations S603 to S609, the memory system may reset the memory device when traffic of data communication performed with the host is the threshold value or less.

In the operations S611 and S613, the memory system may perform the data communication with the host, using hardware in place of the firmware.

In accordance with embodiments of the present disclosure, there can be provided a memory system for communicating with a host, using hardware in place of firmware, and resetting a memory device in firmware malfunction, and an operating method of the memory system.

While the embodiments of the present disclosure have been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps (i.e., operations) may be selectively performed or part of the steps may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made based on the technological scope of the present disclosure.

The embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. Furthermore, the embodiments may be combined to form additional embodiments.

What is claimed is:

1. A memory system comprising:

a memory device; and a memory controller configured to execute firmware which controls the memory device, perform, when an abnormal event of the firmware is sensed, data communication with a host, based on hardware in place of the firmware, reset the memory device when access traffic of the host to the memory device is a threshold value or less, and monitor the access traffic, wherein the memory controller includes an operation manager configured to perform, in response to a firmware abnormal signal, the data communication with the host based on the hardware in place of the firmware, and reset the memory device when the access traffic is the threshold value or less.

2. The memory system of claim 1, wherein the memory controller includes a firmware driver configured to execute the firmware, and activate the firmware abnormal signal when the abnormal event of the firmware is sensed, and wherein, when a dump request is generated due to a crash in a central processing unit (CPU) of the memory controller or when entrance into a sleep mode is made due to a request of the host or a policy of the memory system, the firmware driver is configured to sense the abnormal event of the firmware, suspend the execution of the firmware, and activate the firmware abnormal signal.

3. The memory system of claim 1, wherein the operation manager includes:

a traffic monitor configured to monitor the access traffic, and activate a reset ready signal when the access traffic is the threshold value or less;

a response manager configured to provide a response to the request of the host in the data communication; and a reset controller configured to enable the traffic monitor and the response manager in response to the firmware abnormal signal.

4. The memory system of claim 3, wherein the reset controller is configured to activate, in response to the reset ready signal, a notification enable signal for requesting that a reset schedule notification for the memory device is to be provided to the host, the notification enable signal being output to the response manager.

5. The memory system of claim 4, wherein the response manager is configured to, in response to the notification enable signal, provide the host with the reset schedule notification of the memory device and activate a notification done signal indicating that the reset schedule notification has been done, the notification done signal being output to the reset controller, and wherein the reset controller is configured to activate, in response to the notification done signal, a reset signal to be output to the memory device.

6. The memory system of claim 5, wherein the response manager is configured to activate the notification done signal when a response to the reset schedule notification is received from the host or when a predetermined time elapses after providing the reset schedule notification to the host.

7. The memory system of claim 3, wherein the traffic monitor includes:

a threshold register configured to store the threshold value; and a traffic counter configured to measure the access traffic through a snoop transaction on a first protocol message transmitted in the data communication.

8. The memory system of claim 7, wherein the first protocol message includes a CXL.mem protocol message.

9. The memory system of claim 3, wherein the response manager includes:

at least one sub-response manager configured to generate a response to a second protocol message received from the host in the data communication; and a message parser configured to analyze the second protocol message, transfer the analyzed message to the at least one sub-response manager, and provide the host with the response to the second protocol message received from the at least one sub-response manager.

10. The memory system of claim 9, wherein the message parser is configured to transfer the analyzed message to a target sub-response manager corresponding to the analyzed message, among the at least one sub-response manager, and provide the host with a response transferred from the target sub-response manager through multiplexing.

11. The memory system of claim 9, wherein the second protocol message includes a CXL.io protocol message.

12. The memory system of claim 9, wherein the response to the second protocol message indicates whether the request of the host has failed or whether the request of the host is valid.

13. The memory system of claim 9, wherein an interface of the at least one sub-response manager includes at least one of a mailbox type and a Vendor Defined Message (VDM) type.

14. A method of operating a memory system including a memory device, the method comprising:

sensing an abnormal event of firmware which controls the memory device;

performing, in response to the abnormal event of the firmware, data communication with a host, based on hardware in place of the firmware;

resetting the memory device when access traffic of the host to the memory device is a threshold value or less; and monitoring the access traffic, wherein monitoring the access traffic includes measuring the access traffic through a snoop transaction on a first protocol message received from the host, and wherein the first protocol message includes a CXL.mem protocol message.

15. The method of claim 14, wherein sensing the abnormal event of the firmware includes sensing the abnormal event of the firmware when a dump request is generated due to a crash in a CPU of the memory system or when entrance into a sleep mode is made due to a request of the host or a policy of the memory system.

16. The method of claim 14, wherein monitoring the access traffic includes activating a reset ready signal when the access traffic is the threshold value or less.

17. The method of claim 16, wherein the resetting of the memory device includes:

providing the host with a reset schedule notification for the memory device in response to the reset ready signal; and outputting a reset signal to the memory device when a response to the reset schedule notification is received from the host or when a predetermined time elapses after providing the reset schedule notification to the host.

18. The method of claim 14, wherein performing the data communication includes:

receiving a request including a second protocol message from the host;

analyzing the second protocol message in response to the request;

generating a response to the second protocol message, using a target interface corresponding to the analyzed message; and providing the host with a response to the second protocol message, wherein the second protocol message includes a CXL.io protocol message, and wherein the target interface includes a mailbox type or a Vendor Defined Message (VDM) type.

* * * * *